No. 629,652. Patented July 25, 1899.
C. A. BROSTROM.
HARROW.
(Application filed Feb. 7, 1899.)
(No Model.)
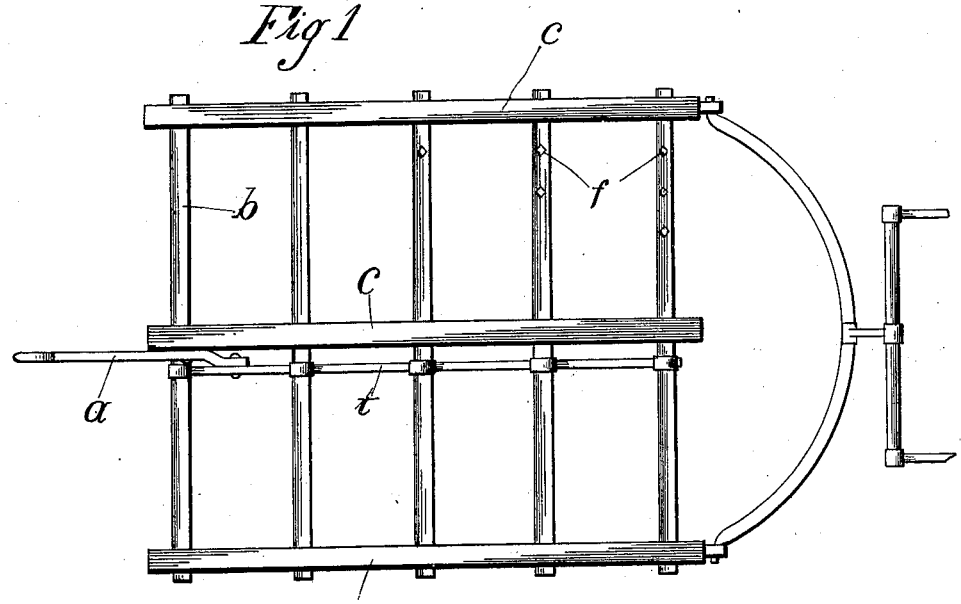
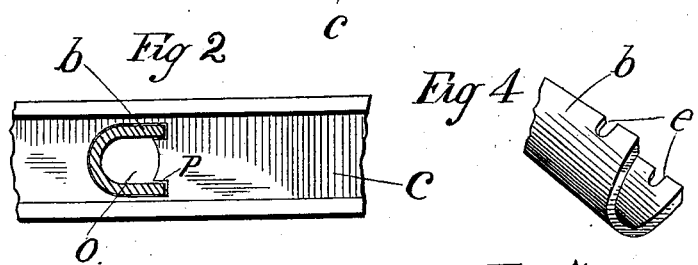
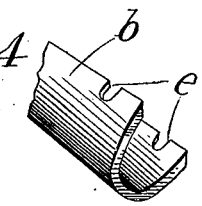
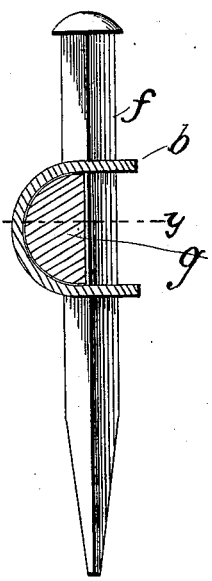
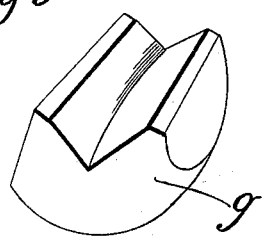
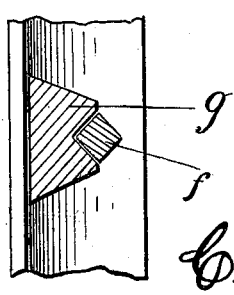
Witnesses
John Maupin.
Rosann Smith.
Inventor
C. A. Brostrom,
per L. G. Susemihl,
Attorney
THE NORRIS PETERS CO., PHOTO-LITHO., WASHINGTON, D. C.

UNITED STATES PATENT OFFICE.

CARL AUGUST BROSTROM, OF MOLINE, ILLINOIS.

HARROW.

SPECIFICATION forming part of Letters Patent No. 629,652, dated July 25, 1899.

Application filed February 7, 1899. Serial No. 704,785. (No model.)

*To all whom it may concern:*

Be it known that I, CARL AUGUST BROSTROM, a citizen of the United States, residing at Moline, in the county of Rock Island and State of Illinois, have invented certain new and useful Improvements in Harrows; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in harrows; and it consists in the side bars provided with suitably-shaped openings and the cross-bars for receiving the teeth, and which cross-bars are suitably notched, so that they can be turned or revolved after their ends have been passed through the side bars, combined with suitably-shaped wedges and the teeth which are held in position in the cross-bars by means of the wedges, all of which will be more fully described hereinafter.

The object of my invention is to construct a harrow in which the use of bolts, nuts, or rivets is done away with to the greatest possible extent and in which the cross-bars carrying the teeth are adapted to partially turn in the side bars, so as to change the inclination of the slant of the teeth.

In the accompanying drawings, which represent my invention, Figure 1 is a plan view of a harrow complete. Figs. 2 and 3 are detail views showing the cross-bars in position. Fig. 4 is a detail view of the end of one of the cross-bars, showing the notches in its edges, so that it can be turned in the side bars. Fig. 5 is a vertical section through one of the side bars. Fig. 6 is a perspective of one of the wedges. Fig. 7 is an end view of one of the cross-bars, showing one of the teeth in position. Fig. 8 is a horizontal section taken through Fig. 7 upon the dotted line $y\ y$.

$c$ represents the parallel bars, which are preferably made of double T-iron, as shown in Fig. 5, and through which are made the openings $o$ for the passage of the ends of the cross-bars $b$. These openings $o$ have the notches or recesses $p$ extending horizontally outward from them, so that the edges of the cross-bars $b$ can be passed through the openings to any desired extent, as shown in Fig. 2. The cross-bars $b$ are made of U-shaped metal, and these bars are provided with the notches $e$ at suitable points, according to the number of the bars $c$, so that the cross-bars can be turned one-half way around after they have been placed in position and can then be rotated sufficiently to change the inclination of the teeth $f$, according as the harrow is to be used for ordinary harrowing or for smoothing the ground. For the purpose of partially revolving or tilting the cross-bars $b$ a lever $a$ and an operating-rod $t$ are used in the usual manner.

Through the cross-bars $b$ are made suitable openings for the teeth $f$, and for the purpose of holding each tooth firmly in position a wedge $g$ is used. These wedges are round upon their outer sides, so as to correspond to the shape of the cross-bars $b$, as shown in Fig. 7, and their inner sides are provided with a groove which is convex at its bottom, so that the wedge is thickest at its center and will serve to more perfectly wedge the tooth into position. After the wedge is placed in position opposite the hole through which the tooth $f$ is passed the tooth is then driven into position, where it is firmly held, as shown in Figs. 7 and 8.

By means of the construction above described it will be seen that not a single bolt, nut, or rivet is used in attaching the bars $c$ and $b$ together nor in holding the teeth $f$ in position. As the bars $b$ are turned one-half way around after they have been passed through the bars $c$, they can be freely oscillated without the slightest danger of their coming apart or of any of the parts working loose. This construction not only greatly cheapens the cost of the harrow, but does away with the necessity for skilled labor in uniting the parts after they have been properly shaped.

Having thus described my invention, I claim—

1. In a harrow, the longitudinal bars $c$, the U-shaped cross-bars provided with suitable openings for the teeth, and the teeth which are passed through the openings, combined with the wedges which are made rounding upon their outer sides and having convex grooves made in their inner sides, substantially as described.

2. In a harrow, the longitudinal bars $c$ having the openings $o$, $p$ made through them, and the U-shaped cross-bars having notches $e$ made in their edges, and openings to receive the teeth combined with the teeth, and the wedges having convex-shaped grooves made in their inner sides, substantially as shown and described.

In testimony whereof I affix my signature in presence of two witnesses.

CARL AUGUST BROSTROM.

Witnesses:
M. A. BLAIR,
I. C. ANDERSON.